(12) United States Patent
Xiong et al.

(10) Patent No.: US 11,832,266 B2
(45) Date of Patent: Nov. 28, 2023

(54) FRAME STRUCTURE AND RESOURCE ALLOCATION SCHEME FOR 5G SYSTEM OPERATING ABOVE 52.6 GHZ CARRIER FREQUENCY

(71) Applicant: Intel Corporation, Santa Clara, CA (US)

(72) Inventors: Gang Xiong, Beaverton, OR (US); Yingyang Li, Beijing (CN); Salvatore Talarico, Los Gatos, CA (US); Dae Won Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 17/193,090

(22) Filed: Mar. 5, 2021

(65) Prior Publication Data

US 2021/0212100 A1    Jul. 8, 2021

Related U.S. Application Data

(60) Provisional application No. 63/005,978, filed on Apr. 6, 2020, provisional application No. 63/005,799, filed
(Continued)

(51) Int. Cl.
*H04W 72/23* (2023.01)
*H04L 27/26* (2006.01)
(Continued)

(52) U.S. Cl.
CPC ........... *H04W 72/23* (2023.01); *H04L 1/1819* (2013.01); *H04L 1/1896* (2013.01);
(Continued)

(58) Field of Classification Search
CPC .. H04W 72/23; H04W 72/535; H04L 1/1819; H04L 1/1896; H04L 27/26025; H04L 27/2607; H04L 1/1854; H04L 1/1864; H04L 1/1887; H04L 5/0091; H04L 27/2602
See application file for complete search history.

(56) References Cited

U.S. PATENT DOCUMENTS

| 2019/0349941 | A1* | 11/2019 | Yang | H04W 24/08 |
| 2021/0037484 | A1* | 2/2021 | Zhou | H04L 1/1854 |
| 2022/0353127 | A1* | 11/2022 | Xin | H04L 1/0003 |

OTHER PUBLICATIONS

"ETSI TS 138 214 V15.8.0", 5G;NR;Physical layer procedures for data(3GPP TS 38.214 version 15.8.0 Release 15), (Jan. 2020), 109 pgs.

* cited by examiner

*Primary Examiner* — Sharmin Chowdhury
(74) *Attorney, Agent, or Firm* — Schwegman Lundberg & Woessner, P.A.

(57) ABSTRACT

A generation Node B (gNB) configured for operating in a fifth generation (5G) system encodes a downlink control information (DCI) for transmission to a user equipment (UE). For slot-less operation the DCI may indicate a set of values for a data channel scheduling gap and hybrid automatic repeat request—acknowledgement (HARQ-ACK) timing. The set of values may be defined for a symbol group including one or more symbols. The gNB may encode the data channel for transmission based on the one or more values. The data channel may be transmitted on the symbol group with slot-less operation and using a subframe or frame for reference timing.

20 Claims, 4 Drawing Sheets

Related U.S. Application Data on Apr. 6, 2020, provisional application No. 62/987,111, filed on Mar. 9, 2020.

(51) Int. Cl.
    *H04L 1/1867*     (2023.01)
    *H04L 1/1812*     (2023.01)
    *H04W 72/50*     (2023.01)

(52) U.S. Cl.
    CPC .... *H04L 27/2607* (2013.01); *H04L 27/26025* (2021.01); *H04W 72/535* (2023.01)

US 11,832,266 B2

FRAME STRUCTURE AND RESOURCE ALLOCATION SCHEME FOR 5G SYSTEM OPERATING ABOVE 52.6 GHZ CARRIER FREQUENCY

PRIORITY CLAIMS

This application claims the benefit of priority under 35 U.S.C. 119(e) to U.S. Provisional Patent Application Ser. No. 62/987,111, filed Mar. 9, 2020, U.S. Provisional Patent Application Ser. No. 63/005,799, filed Apr. 6, 2020, and U.S. Provisional Patent Application Ser. No. 63/005,978, filed Apr. 6, 2020, which are incorporated herein by reference in their entireties.

TECHNICAL FIELD

Embodiments pertain to wireless communications. Some embodiments relate to fifth generation (5G) networks. Some embodiments relate to slot-less operation. Some embodiments pertain to communications above 52.6 GHz carrier frequencies.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Figure 1:
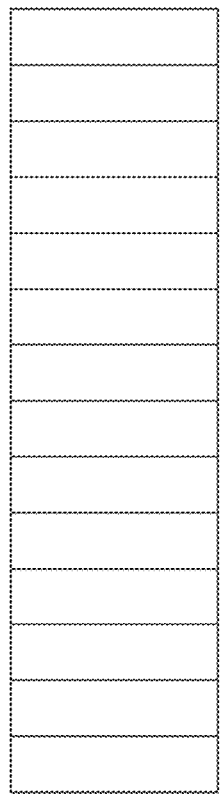
FIG. 1 illustrates a slot duration of 14 symbols with large subcarrier spacing.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a generation Node B (gNB) configured for operating in a fifth generation (5G) system. The gNB is configured to encode a downlink control information (DCI) for transmission to a user equipment (UE). In these embodiments, the DCI may schedule a data channel transmission. In these embodiments, for slot-less operation, the DCI may indicate a set of values for a data channel scheduling gap and hybrid automatic repeat request—acknowledgement (HARQ-ACK) timing. The set of values may be defined for a symbol group including one or more symbols. In these embodiments, the gNB may encode the data channel for transmission based on the one or more values. In these embodiments, the data channel may be transmitted on the symbol group with slot-less operation and using a subframe or frame for reference timing.

In some embodiments, values of the set of values for the data channel scheduling gap includes: a first scheduling gap (G0) corresponding to a number of symbols between a physical downlink control channel (PDCCH) carrying the DCI and a physical downlink shared channel (PDSCH) scheduled by the DCI; and a second scheduling gap (G2) corresponding to a number of symbols between the PDCCH and a physical uplink shared channel (PUSCH) scheduled by the DCI.

In some embodiments, values of the set of values for the HARQ-ACK timing include a HARQ-ACK timing gap (G1) corresponding to a number of symbols between the PDSCH and a subsequent PUCCH, the HARQ-ACK timing gap (G1) for receipt of HARQ-ACK transmissions from the UE.

In some embodiments, the gNB may transmit OFDM symbols for communicating with the in accordance with a frame structure, the transmitted OFDM symbols having an effective symbol length, a subcarrier spacing (SCS) of $15 \cdot 2^\mu$ kHz and a cyclic prefix (CP).

In some embodiments, a ratio of a length of the CP and the effective OFDM symbol length is approximately A/B when B OFDM symbols with a CP are allocated in periods equaling $(A+B) \cdot T_{OFDM}$, where $\mu$ is a positive integer less than or equal to eight, and $T_{OFDM}$ is the effective OFDM symbol length.

In some embodiments, the gNB may allocate an integer number of OFDM symbols every X milliseconds (ms) where X is selected from the set of 0.5, 1, 2.5, 5 and 10.

In some embodiments, for different CP lengths, the effective OFDM symbol length without the CP, of each OFDM symbol is equal to: $T_{OFDM} = [X - (T_{CP1} \cdot A + T_{CP2} \cdot B)]/[(A+B)]$, wherein $T_{CP1}$ is a length of a first CP and $T_{CP2}$ is a length of a second CP.

In some embodiments, symbol boundaries of the transmitted OFDM symbols are configured to be aligned with symbol boundaries of OFDM symbols having a 15 KHz SCS.

In some embodiments, the ratio of the length of the CP and the effective OFDM symbol length is 11/64 wherein the symbol boundary with the SCS $15 \cdot 2^\mu$ kHz is aligned with a symbol boundary with a SCS of 15 kHz and a normal CP in every 2.5 milliseconds.

In some embodiments, the gNB is configured for communicating with the UE at a carrier frequency above 52.6 GHz.

In some embodiments, the memory of the gNB may be configured to store the DCI.

Some embodiments are directed to a non-transitory computer-readable storage medium that stores instructions for execution by processing circuitry of a generation Node B (gNB) configured for operating in a fifth generation (5G) system. Some embodiments are directed to an apparatus of a user equipment (UE) configured for operating in a fifth generation (5G) system.

In Rel-15, resource allocation of one data transmission is confined within a slot, where one slot has 14 symbols. For system operating above 52.6 GHz carrier frequency, it is envisioned that a larger subcarrier spacing is needed to combat severe phase noise. In case when a larger subcarrier spacing, e.g., 1.92 MHz or 3.84 MHz is employed, the slot duration can be very short. For instance, for 1.92 MHz subcarrier spacing, one slot duration is approximately 7.8 μs as shown in FIG. 1. This extremely short slot duration may not be sufficient for higher layer processing, including Medium Access Layer (MAC) and Radio Link Control (RLC), etc.

To address this issue, one option is to increase the number of symbols within a slot. Alternatively, gNB may schedule the DL or UL data transmission across slot boundary. This option may indicate that the concept of slot may not be necessary, which may provide maximal flexibility at gNB on the data scheduling. To enable slot-less operation, certain mechanisms may need to be considered for frame structure and resource allocation for system operating above 52.6 GHz carrier frequency.

This disclosure describes a novel frame structure and resource allocation for system operating above 52.6 GHz carrier frequency. For example, disclosed herein are:

Novel frame structure design
Reference timing for slot-less operation
Scheduling and HARQ timing of slot-less operation
Novel Frame Structure Design For system operating above 52.6 GHz carrier frequency, it is envisioned that a larger subcarrier spacing (SCS), e.g., 1.92 MHz or 3.84 MHz, is needed to combat severe phase noise. Consequently, the length of an OFDM symbol and its CP become very short. Especially for the case if normal CP in NR is directly scaled for the high carrier frequency, e.g. about 36.62 ns for SCS 1.92 MHz, the CP length is comparable or even less than the timing error between multiple antennas or beam switching time. On the other hand, the extension of extended CP in NR to high carrier frequency may work, but it results in large CP overhead. Several principles could be considered in the choice of a new CP length hence a new frame structure.

1) Overhead of CP is in between normal CP and extended CP;
2) An integer number of OFDM symbols are allocated in every X ms. By this way, it is possible to define strictly periodical channels/signals with periodicity of P·X ms, where P is integer. The symbol boundary could be aligned with a symbol boundary with SCS 15 kHz and normal CP in every X ms. For example, X could be 0.5, 1, 2.5, 5 or 10.
3) It is desirable CP length for all OFDM symbols are equal;
4) If 3) is not satisfied, one or more symbols with a longer CP could be allocated in fixed position(s) a group of N consecutive symbols (e.g. symbol group). If the resource allocation is also done in the granularity of symbol group, the difference of CP length becomes transparent in the slot-less operation.

Throughout this disclosure, unless otherwise noted, the size of various fields in the time domain is expressed in time units $T_c=1/(\Delta f_{max} \cdot N_f)$, e.g. $\Delta f_{max}=3840 \cdot 10^3$ Hz and $N_f=4096$. The constant $\kappa=T_s/T_c=512$ where $T_s=1/(\Delta f_{ref} \cdot N_{f,ref})$, $\Delta f_{ref}=15 \cdot 10^3$ Hz and $N_{f,ref}=2048$. Specifically, a radio frame of 10 ms has $307200\kappa \cdot T_c$. For SCS $15 \cdot 2^\mu$ kHz, an effective OFDM symbol has $T_{OFDM}=2048\kappa \cdot 2^{-\mu} \cdot T_c$. Therefore, the length of a radio frame equals to $150 \cdot 2^\mu \cdot T_{OFDM}$.

In one embodiment of the disclosure, to satisfy above principle 1), 2) with X=2.5 ms and 3), the ratio of length of CP and effective OFDM symbol could be 11/64. That is, every period of $75 \cdot T_{OFDM}$ is divided into 64 OFDM symbols with CP of length $11/64 \cdot T_{OFDM}$. Therefore, for SCS $15 \cdot 2^\mu$ kHz, a radio frame consists of $128 \cdot 2^\mu$ OFDM symbol with CP. The CP length for each OFDM symbol is $T_{CP}=352\kappa \cdot 2^{-\mu} \cdot T_c$. With this scheme, there are integer number of OFDM symbols in every $10/2^k$ ms, k=0, 1, ... μ+7. Specifically, the symbol boundary with SCS $15 \cdot 2^\mu$ kHz is aligned with a symbol boundary with SCS 15 kHz and normal CP in every 2.5·n ms, n=1, 2, ....

Figure 2:
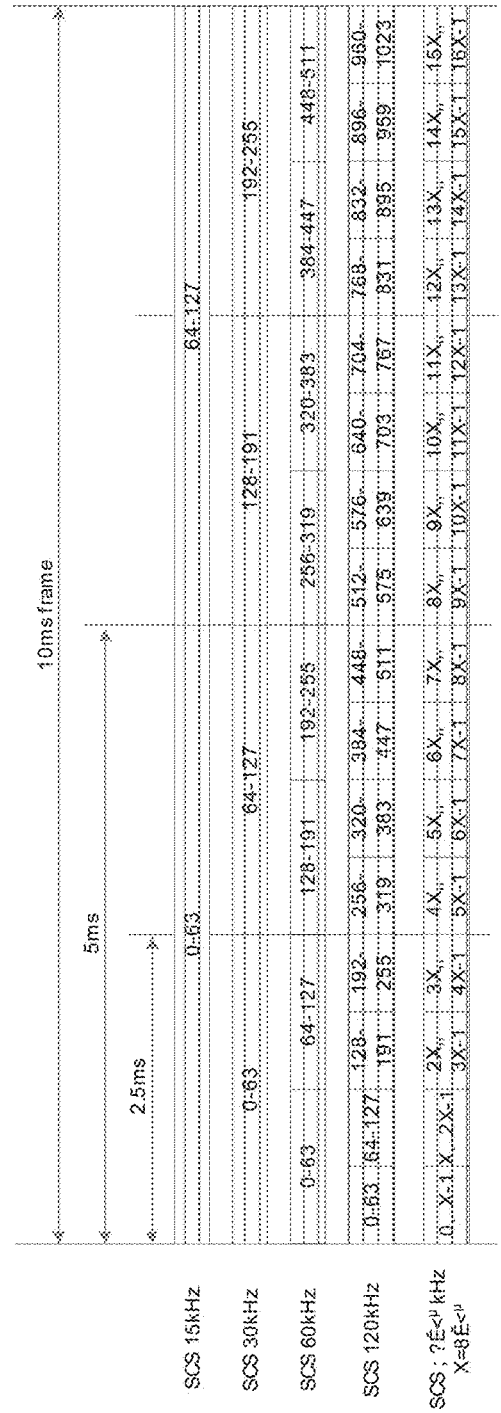
FIG. 2 illustrates a frame structure with 2.5 ms alignment in accordance with some embodiments.

FIG. 2 illustrates symbol boundary alignment of a frame with the new CP $T_{CP}=352\kappa \cdot 2^{-\mu} \cdot T_c$. With SCS 120 kHz, the CP length is $352 \cdot 64 \cdot T_c$. A period of 2.5 ms, 5 ms and 10 ms consists of 256, 512 and 1024 OFDM symbols respectively. In one example, when subcarrier spacing is 1.92 MHz, the symbol duration is ~0.52 us and CP length is 89.5 ns.

In one embodiment of the disclosure, by applying above principle 4) for a group of G symbols, the above principle 1) and 2) could be satisfied too. For SCS $15 \cdot 2^\mu$ kHz, the length of a radio frame equals to $150 \cdot 2^\mu \cdot T_{OFDM}$. Assuming B OFDM symbols with CP are allocated in every period $(A+B) \cdot T_{OFDM}$, the ratio of length of CP and effective OFDM symbol is about A/B. To satisfy above principle 2) with X=0.5 ms, the value A+B needs to be a factor of $15 \cdot 2^{\mu-1}$. G is factor of B, e.g. B=G·X so that the B OFDM symbols could be divided into X symbol groups. X is power of 2 so that allocated CP lengths for the symbols in a symbol group repeat in different symbol groups.

In one option, to satisfy above principle 2) with X=0.1 ms, the value A+B needs to be a factor of $3 \cdot 2^{\mu-1}$. G is factor of B, e.g. B=G·X so that the B OFDM symbols could be divided into X symbol groups. X is power of 2 so that allocated CP lengths for the symbols in a symbol group repeat in different symbol groups.

Figure 3:
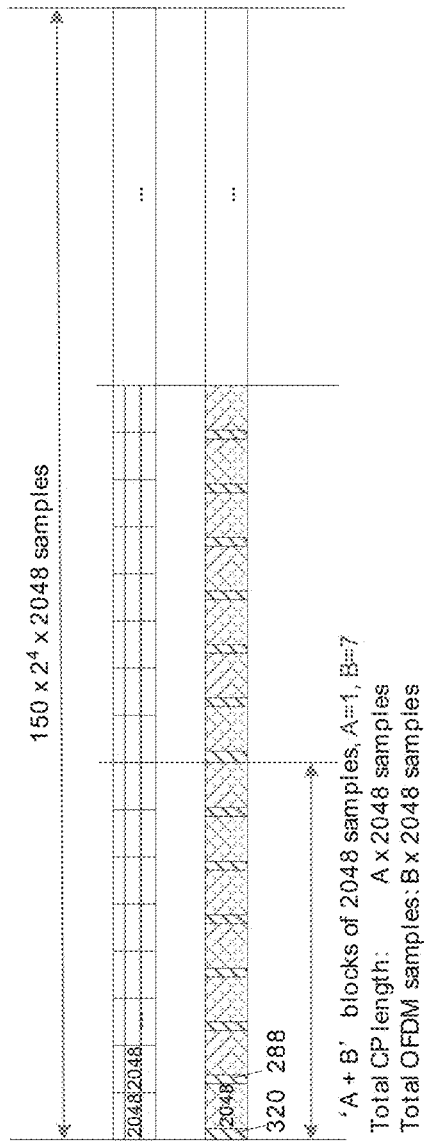
FIG. 3 illustrates a frame structure with symbols having different CPs in accordance with some embodiments.

FIG. 3 illustrates one example of the concept describe above where G=7, μ=4, e.g. SCS $15 \cdot 2^4=240$ kHz, A=1, B=7, X=1, A+B=8 is a factor of $3 \cdot 2^{\mu-1}=24$, the ratio of length of CP and effective OFDM symbol is about A/B=1/7. In this case, a period of $T_{OFDM}$ are divided into the CPs for the 7 symbols in a symbol group. For example, the CP of the first symbol in a symbol group is $320\kappa \cdot 2^{-\mu} \cdot T_c$, while CP of the other symbols is $288\kappa \cdot 2^{-\mu} \cdot T_c$.

In another option, to satisfy above principle 2) with X=0.5 ms, the value A+B needs to be a factor of $15 \cdot 2^{\mu-1}$. G is factor of B, e.g. B=G·X so that the B OFDM symbols could be divided into X symbol groups. X is power of 2 so that allocated CP lengths for the symbols in a symbol group repeat in different symbol groups.

In one example, G=5, μ=3, e.g. SCS $15 \cdot 2^3=120$ kHz, A=1, B=5, X=1, A+B=6 is a factor of $15 \cdot 2^{\mu-1}=60$, the ratio of length of CP and effective OFDM symbol is about A/B=1/5. In this case, a period of $T_{OFDM}$ are divided into the CPs for the 5 symbols in a symbol group. For example, the CP of the first symbol in a symbol group is $448\kappa \cdot 2^{-\mu} \cdot T_c$, while CP of the other symbols is $400\kappa \cdot 2^{-\mu} \cdot T_c$.

In one example, G=7, μ=3, e.g. SCS $15 \cdot 2^3=120$ kHz, A=1, B=14, X=2, A+B=15 is a factor of $15 \cdot 2^{\mu-1}=60$, the ratio of length of CP and effective OFDM symbol is about A/B=1/14. In this case, a period of $T_{OFDM}$ are divided into the CPs for the 14 symbols in two symbol groups. For example, the CP of the first symbol in a symbol group is $160\kappa \cdot 2^{-\mu} \cdot T_c$, while CP of the other symbols is $144\kappa \cdot 2^{-\mu} \cdot T_c$.

In one embodiment of this disclosure, by applying above principle 4) for a group of G symbols, the above principle 1) and 2) could be satisfied as well as follows. In this matter let define $X=15 \cdot Y \cdot 2^{\mu} \cdot T_{OFDM}$, where for Y=1, 2.5, 5, and 10 then X is equivalent to 1 ms, 2.5 ms, 5 ms, and 10 ms, respectively. Given A symbols that have CP equal to $T_{CP1}$, and B symbols that have CP equal to $T_{CP2}$, then G=A+B, and the common effective length of each symbol is equal to:

$$T'_{OFDM}=[X-(T_{CP1} \cdot A+T_{CP2} \cdot B)]/[(A+B)]$$

As an example, the symbols belonging to one group have a fixed pattern, where for instance the symbols with the larger CP precede those with smaller CP, or vice versa or they may be equally spread within a group starting with the symbols with a larger or smaller CP. Given a specific patter, this may repeat periodically every A+B symbols.

Reference Timing for Slot-Less Operation

As mentioned above, in Rel-15, resource allocation of one data transmission is confined with a slot, where one slot has 14 symbols. For system operating above 52.6 GHz carrier frequency, it is envisioned that a larger subcarrier spacing is needed to combat severe phase noise. In case when a larger subcarrier spacing, e.g., 1.92 MHz or 3.84 MHz is employed, the slot duration can be very short. This extremely short slot duration may not be sufficient for higher layer processing, including Medium Access Layer (MAC) and Radio Link Control (RLC), etc.

To address this issue, one option is to increase the number of symbols within a slot. Alternatively, gNB may schedule the DL or UL data transmission across slot boundary. In other words, this may indicate that the concept of slot may not be necessary, which may provide maximal flexibility at gNB on the data scheduling. To enable slot-less operation, certain mechanisms may need to be considered for scheduling and resource allocation of data transmission for system operating above 52.6 GHz carrier frequency.

Embodiments of reference timing for slot-less operation for system operating above 52.6 GHz carrier frequency are provided as follows:

In one embodiment of the disclosure, reference timing can be fixed in the specification. For instance, 1 ms subframe or 10 ms frame can be considered as reference timing for slot-less operation. As another example, 2.5 ms can be considered as reference timing for slot-less operation based on proposed frame structure.

Note that reference timing can be used for the configuration of transmission timing of different physical channels and/or signals. More specifically, the starting position and/or periodicity of different physical channels and/or signals can be configured with regards to the reference timing. Further, the starting position and periodicity can be configured in terms of symbol or a number of symbols. In the latter case, a number of symbols, or symbol group may be predefined in the specification or configured by higher layers via minimum system information (MSI), remaining minimum system information (RMSI), other system information (OSI) or dedicated radio resource control (RRC) signalling.

The physical channels and/or signals may include, but not limited to the following:

In the DL: physical downlink control channel (PDCCH) monitoring occasion, channel state information-reference signal (CSI-RS), tracking reference signal (TRS), semi-persistent scheduled physical downlink shared channel (SPS PDSCH)

In the UL: physical random-access channel (PRACH), scheduling request (SR), physical uplink control channel (PUCCH) carrying CSI, sounding reference signal (SRS), configured grant physical uplink shared channel (CG-PUSCH)

In NR Rel-15, the reference timing for different configured channels/signals could be slot 0 of radio frame with system frame number (SFN) 0, or slot 0 of a radio frame. On the other hand, the actual transmission of control and data channels/signals are limited to be within a slot. For a system operating above 52.6 GHz carrier frequency, a slot is very short, which is not efficient for resource allocation. Slot-less transmission could be used for a control and data channel/signal. On the other hand, the concept of slot may be still used in the configuration of the start of time resource of configured channels/signals. For example, the start of time resource is indicated by a periodicity, an offset in number of slots and a start symbol within a slot, if applicable. However, the length of time resource of configured channels/signals is not limited by either the slot boundary or slot length.

Figure 4:
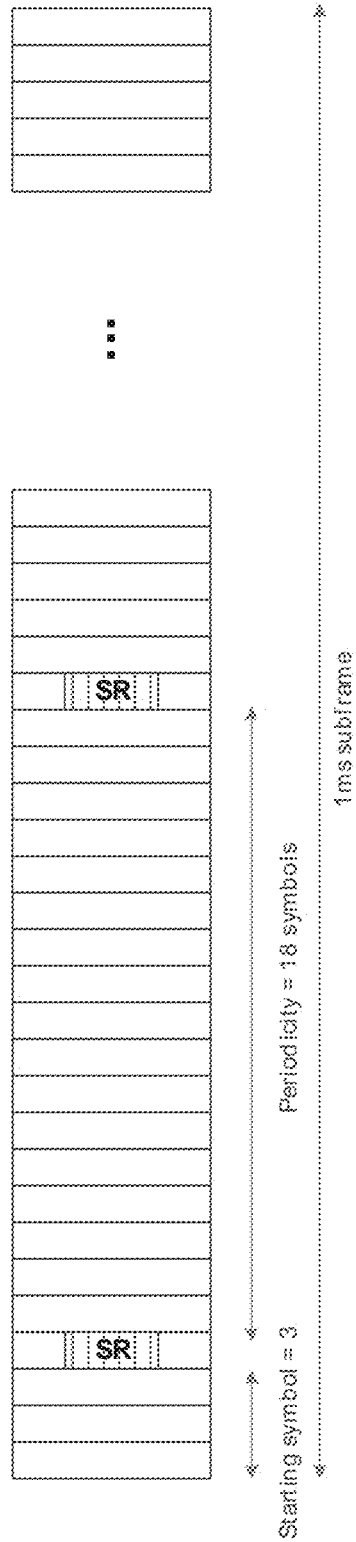
FIG. 4 illustrates SR configuration with reference to 1 ms subframe in accordance with some embodiments.

FIG. 4 illustrates one example of SR configuration with reference to 1 ms subframe boundary. In the example, the starting symbol and periodicity of SR configuration is 3 and 18 symbols, respectively.

In another embodiment of the disclosure, a UE specific reference timing can be considered for slot-less operation. In particular, the reference timing can be defined in accordance with the detected synchronization signal block (SSB), or the GC-PDCCH or the related demodulation reference signal (DMRS).

Scheduling and HARQ Timing of Slot-Less Operation

Embodiments of scheduling and hybrid automatic repeat request (HARQ) timing of slot-less operation for system operating above 52.6 GHz carrier frequency are provided as follows:

In one embodiment of the disclosure, a scheduling gap between physical downlink control channel (PDCCH) and physical downlink shared channel (PDSCH), (denoted as $G_0$); or between PDCCH and physical uplink shared channel (PUSCH), (denoted as $G_2$) can be defined in term of symbol level or symbol group level as mentioned above. For scheduling of PDSCH, the scheduling gap, $G_0$, may be defined between starting or last symbol of the PDCCH and starting symbol of the scheduling PDSCH. Similarly, for scheduling of PUSCH, the scheduling gap, $G_2$, may be defined between last symbol of the PDCCH and starting symbol of the scheduling PUSCH.

Further, the scheduling gap for $G_0$ and/or $G_2$ may be predefined in the specification, configured by higher layers via RMSI (SIB1), OSI or RRC signalling, or dynamically indicated in the downlink control information (DCI) or a combination thereof.

In one option, a set of values for scheduling gap for $G_0$ and/or $G_2$ may be predefined in the specification, and one field in the DCI may be used to indicate which one value is selected from the set of values for the scheduling gaps. This may apply for the case when fallback DC, e.g., DCI format 0_0 and/or 1_0 is used to schedule the PDSCH and/or PUSCH transmission, respectively.

In another option, a set of values for scheduling gap for $G_0$ and/or $G_2$ may be configured by higher layer via SIB1 and/or dedicated RRC signalling. In case when the set of values are not provided by dedicated RRC signaling, the values which are configured SIB1 are used; when the set of values are provided by dedicated RRC signaling, the values which are configured dedicated RRC signaling are used. Further, one field in the DCI may be used to indicate which one value is selected from the set of values for the scheduling gaps. This may apply for the case when non-fallback DCI, e.g., DCI format 0_1, 0_2, and/or 1_0, 1_2 is used to schedule the PDSCH and/or PUSCH transmission, respectively.

Note that for the scheduling of PDSCH transmission, when the scheduling gap is defined between the last symbol of PDCCH and starting symbol of PDSCH, $G_0$ may be less than 0. This indicates that the starting symbol of PDSCH may be aligned with that of PDCCH transmission. This may also apply for the case when the scheduling gap is defined between the starting symbol of PDCCH and starting symbol of PDSCH, where $G_0$ may be equal to 0.

In another embodiment of the disclosure, scheduling gap for $G_0$ and/or $G_2$ and the length of PDSCH and/or PUSCH transmission can be indicated as part of time domain resource allocation (TDRA).

In one option, a default TDRA table is defined for PDSCH/PUSCH transmission, wherein each row of the table includes scheduling gap and length of scheduled PDSCH/PUSCH transmission. The default table may be overridden by TDRA configuration which is configured by either SIB1 or dedicated RRC signalling. In case when both TDRA configuration is configured by both SIB1 and dedicated RRC signalling, the TDRA configuration which is configured by SIB1 is overridden by that which is configured by dedicated RRC signalling.

Further, one field in the DCI can be used to select one row from the TDRA configuration or default TDRA table. For instance, DCI format 0_0 and 1_0 can be used to indicate one row from the default TDRA table for both scheduling gap and length of corresponding PUSCH and PDSCH transmission, respectively. If TDRA configuration is configured by dedicated RRC signalling, DCI format 0_1, 0_2 and 1_1, 1_2 can be used to indicate one row from the TDRA configuration for both scheduling gap and length of corresponding PUSCH and PDSCH transmission, respectively.

Note that other parameters including PDSCH/PUSCH mapping type may be also included in the TDRA table or configuration.

In another embodiment of the disclosure, a scheduling gap between PDCCH and PDSCH is expressed as $G_0=g_0+d_0$. A set of values of $g_0$ may be configured by higher layer via SIB1 and/or dedicated RRC signalling. In case when the set of values are not provided by dedicated RRC signaling, the values which are configured SIB1 are used; when the set of values are provided by dedicated RRC signaling, the values which are configured dedicated RRC signalling are used. Further, one field in the DCI may be used to indicate which one value is selected from the set of values of $g_0$. Alternatively, $g_0$ can be indicated as part of time domain resource allocation (TDRA). The value of $d_0$ is may be predefined or configured by higher layer via SIB1 and/or dedicated RRC signalling. For example, for cross-carrier scheduling with different numerology between PDCCH carrier and PDSCH carrier, $d_0$ accounts for the additional delay required to avoid extra buffering at UE side.

In another embodiment of the disclosure, a scheduling gap between PDCCH and PUSCH is expressed as $G_2=g_2+d_2$. A set of values of $g_2$ may be configured by higher layer via SIB1 and/or dedicated RRC signalling. In case when the set of values are not provided by dedicated RRC signaling, the values which are configured SIB1 are used; when the set of values are provided by dedicated RRC signaling, the values which are configured dedicated RRC signalling are used. Further, one field in the DCI may be used to indicate which one value is selected from the set of values of $g_2$.

Alternatively, $g_2$ can be indicated as part of time domain resource allocation (TDRA). The value of $d_2$ is may be predefined or configured by higher layer via SIB1 and/or dedicated RRC signalling. For example, $d_2$ is determined by the UE preparation time of PUSCH. $d_2$ could be equal to $N_2$ which is up to UE capability, or $d_2$ could also include the impacts of DMRS position, length of PUSCH and etc.

In another embodiment of the disclosure, HARQ-ACK feedback timing (denoted as $G_1$) may be defined in accordance with the starting or last symbol of PDCCH or PDSCH transmission and the starting symbol of PUCCH carrying HARQ-ACK feedback. Alternatively, G may be defined in accordance with the starting or last symbol of PDCCH or PDSCH transmission and a reference starting symbol. The offset between the actual starting symbol of PUCCH carrying HARQ-ACK feedback and the reference starting symbol is configured in the configuration of the PUCCH. Note that the HARQ-ACK feedback timing can be defined in term of symbol level or symbol group level as mentioned above. Further, the HARQ-ACK feedback timing can be predefined in the specification, configured by higher layers via RMSI (SIB1), OSI or RRC signalling, or dynamically indicated in the downlink control information (DCI) or a combination thereof.

Figure 5:
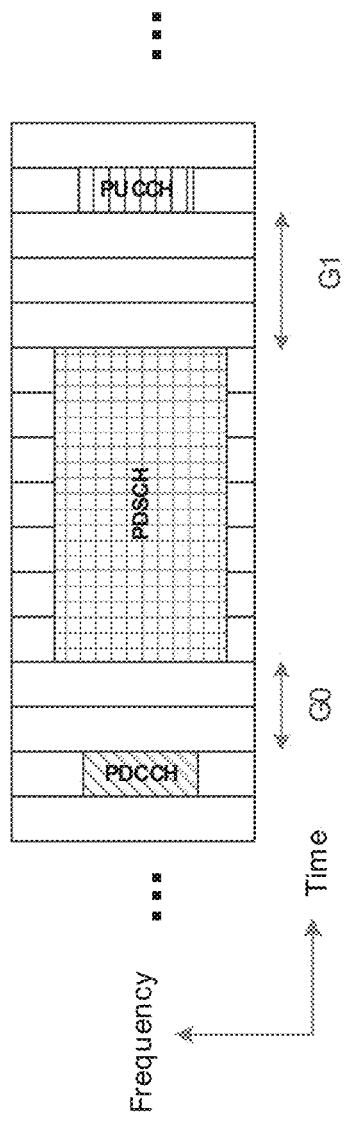
FIG. 5 illustrates scheduling and HARQ timing of DL transmission for slot-less operation in accordance with some embodiments.

FIG. 5 illustrates one example of scheduling and HARQ timing of DL transmission for slot-less operation. In the example, the scheduling gap between PDCCH and PDSCH is 3 symbols. The HARQ-ACK gap between PDSCH and PUCCH carrying HARQ-ACK feedback is 4 symbols.

Figure 6:
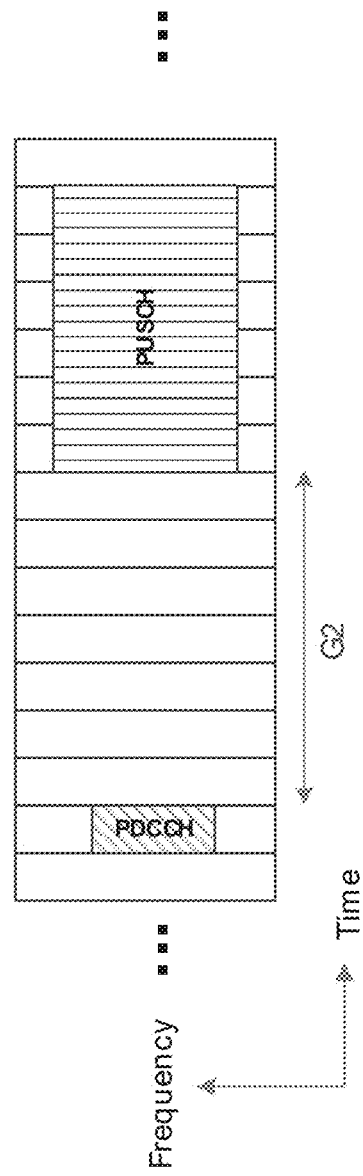
FIG. 6 illustrates scheduling timing of UL transmission for slot-less operation in accordance with some embodiments.

FIG. 6 illustrates one example of scheduling timing of UL transmission for slot-less operation. In the example, the scheduling gap between PDCCH and PUSCH is 8 symbols.

In another embodiment of the disclosure, HARQ-ACK feedback timing $G_1$ may be expressed as $G_1=g_1+d_1$. The value of $g_1$ can be predefined in the specification, configured by higher layers via RMSI (SIB1), OSI or RRC signalling, or dynamically indicated in the downlink control information (DCI) or a combination thereof. The value of $d_1$ is may be predefined or configured by higher layer via SIB1 and/or dedicated RRC signalling. For example, $d_1$ is determined by the UE processing time of PDSCH. $d_1$ could be equal to $N_1$ which is up to UE capability, or $d_1$ could also include the impacts of DMRS position, length of PDSCH and etc.

In another embodiment of the disclosure, HARQ-ACK feedback timing $G_1$ may be expressed as $G_1=g_1+d_{1,1}+d_{1,2}$. The value of $g_1$ can be predefined in the specification, configured by higher layers via RMSI (SIB1), OSI or RRC signalling, or dynamically indicated in the downlink control information (DCI) or a combination thereof. The value of $d_{1,1}$ is may be predefined or configured by higher layer via SIB1 and/or dedicated RRC signalling. For example, $d_{1,1}$ is determined by the UE processing time of PDSCH. $d_{1,1}$ could be equal to $N_1$ which is up to UE capability, or $d_{1,1}$ could also include the impacts of DMRS position, length of PDSCH and etc. The value of $d_{1,2}$ is the additional offset of the starting symbol of PUCCH carrying HARQ-ACK feedback, which could be configured in the configuration of the PUCCH.

In another embodiment of the disclosure, when different subcarrier spacings are configured for the transmission of PDCCH and PDSCH, and/or PUSCH, the number of symbol or symbol groups is determined in accordance with the numerology of scheduled transmission, e.g., PDSCH and/or PUSCH.

Further, the reference starting symbol of PDSCH and PUSCH, e.g., $G_0=0$ and $G_2=0$, corresponds to the first symbol index of PDSCH and/or PUSCH which overlaps with the last symbol of PDCCH, respectively. In another option, $G_0=0$ and $G_2=0$, corresponds to the last symbol index of PDSCH and/or PUSCH which overlaps with the last symbol of PDCCH, respectively. Alternatively, $G_0=0$ corresponds to the first symbol index of PDSCH which overlaps with the first symbol of PDCCH.

In particular, for scheduling of PDSCH transmission,
The starting symbol for the PDSCH is $$\left\lfloor n \cdot \frac{2^{\mu PDSCH}}{2^{\mu PDCCH}} \right\rfloor + G_0,$$

where n is the last symbol of the scheduling DCI, and G_0 is based on the numerology of PDSCH, and µ_"PDSCH" and µ_"PDCCH" are the subcarrier spacing configurations for PDSCH and PDCCH, respectively.

Similarly, for scheduling of PUSCH transmission,
The starting symbol where the UE shall transmit the PUSCH is determined by $G_2$ as $$\left\lfloor n \cdot \frac{2^{\mu PUSCH}}{2^{\mu PDCCH}} \right\rfloor + G_2$$

where n is the last symbol with the scheduling DCI, $G_2$ is based on the numerology of PUSCH, and $\mu_{PUSCH}$ and $\mu_{PDCCH}$ are the subcarrier spacing configurations for PUSCH and PDCCH, respectively.

In another embodiment of the disclosure, similar to the scheduling timing, when different subcarrier spacings are configured for the transmission of PDSCH and PUCCH, the number of symbol or symbol groups is determined in accordance with the numerology of PUCCH transmission carrying HARQ-ACK feedback of the corresponding PDSCH.

Further, the reference symbol of PUCCH, e.g., $G_3=0$ corresponds to the first or last symbol index of PUCCH which overlaps with the last symbol of PDCCH. Alternatively, $G_1=0$ corresponds to the last symbol index of PUCCH which overlaps with the first symbol of PDCCH.

With reference to starting symbol for PUCCH transmissions, if the UE detects a DCI format 1_0 or a DCI format 1_1 scheduling a PDSCH reception ending in symbol n or if the UE detects a DCI format 1_0 indicating a SPS PDSCH release through a PDCCH reception ending in symbol n, the UE provides corresponding HARQ-ACK information in a PUCCH transmission from symbol $n+G_1$, where $G_L$ is a number of symbols and is indicated by the PDSCH-to-HARQ-timing-indicator field in the DCI format, if present, or provided by dl-DataToUL-ACK. $G_1=0$ corresponds to the last symbol of the PUCCH transmission that overlaps with the PDSCH reception or with the PDCCH reception in case of SPS PDSCH release.

Figure 7:
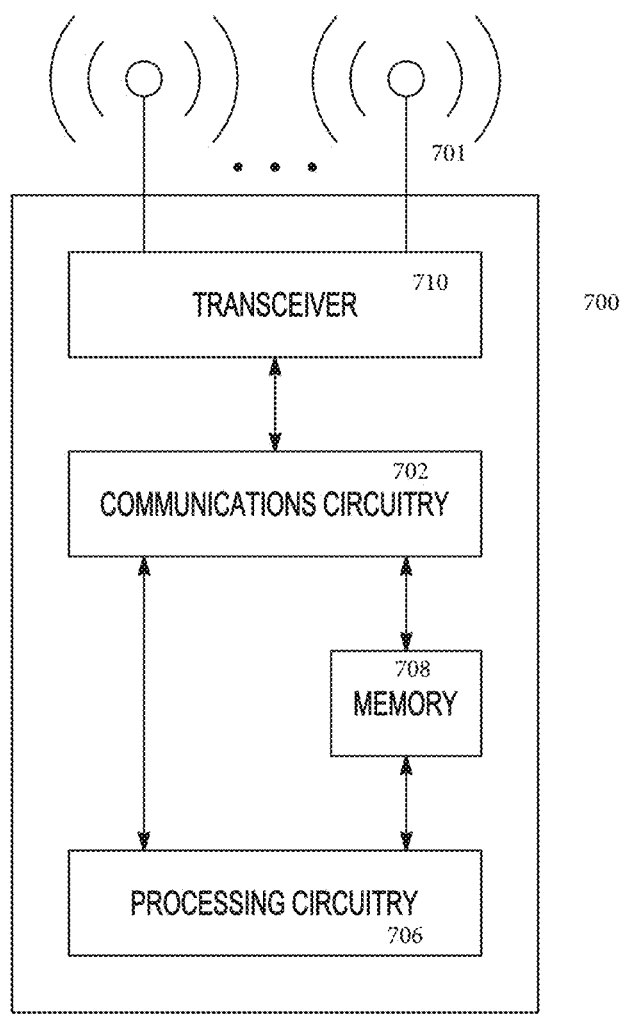
FIG. 7 illustrates a functional block diagram of a wireless communication device in accordance with some embodiments.

FIG. 7 illustrates a functional block diagram of a wireless communication device in accordance with some embodiments. In some embodiments, communication station 700 may be suitable for use as a gNB. In some embodiments, communication station 700 may be suitable for use as a UE.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

EXAMPLES

Example 1 may include a method of wireless communication for a fifth generation (5G) or new radio (NR) system, the method comprising:

configuring, by a gNodeB (gNB), a set of values for data channel scheduling and hybrid automatic repeat request—acknowledgement (HARQ-ACK) timing in a form of symbol and/or symbol group; and indicating, by gNB, in a field in a downlink control information (DCI), a value from the set of values for data channel scheduling.

Example 2 may include the method of example 1 or some other example herein, wherein the ratio of length of CP and effective OFDM symbol could be 11/64, wherein symbol boundary with SCS $15 \cdot 2^\mu$ kHz is aligned with a symbol boundary with SCS 15 kHz and normal CP in every $2.5 \cdot n$ ms, $n=1, 2, \ldots$.

Example 3 may include the method of example 1 or some other example herein, wherein the ratio of length of CP and effective OFDM symbol is about A/B when assuming B OFDM symbols with CP are allocated in every period $(A+B) \cdot T_{OFDM}$.

Example 4 may include the method of example 1 or some other example herein, wherein common effective length of each symbol is equal to: $T_{OFDM}=[X-(TCP1 \cdot A+TCP2 \cdot B)]/[(A+B)]$.

Example 5 may include the method of example 1 or some other example herein, wherein 1 ms subframe or 10 ms frame can be considered as reference timing for slotless operation.

Example 6 may include the method of example 1 or some other example herein, wherein reference timing can be defined in accordance with the detected synchronization signal block (SSB), or the GC-PDCCH or the related demodulation reference signal (DMRS).

Example 7 may include the method of example 1 or some other example herein, wherein a scheduling gap between physical downlink control channel (PDCCH) and physical downlink shared channel (PDSCH), (denoted as $G_0$); or between PDCCH and physical uplink shared channel (PUSCH), (denoted as $G_2$) can be defined in term of symbol level or symbol group level.

Example 8 may include the method of example 1 or some other example herein, wherein the scheduling gap for $G_0$ and/or $G_2$ may be predefined in the specification, configured by higher layers via RMSI (SIB1), OSI or RRC signalling, or dynamically indicated in the downlink control information (DCI) or a combination thereof.

Example 9 may include the method of example 1 or some other example herein, wherein scheduling gap for $G_0$ and/or $G_2$ and the length of PDSCH and/or PUSCH transmission can be indicated as part of time domain resource allocation (TDRA).

Example 10 may include the method of example 1 or some other example herein, wherein a scheduling gap between PDCCH and PDSCH is expressed as $G_0=g_0+d_0$, wherein a set of values of $g_0$ may be configured by higher layer via SIB1 and/or dedicated RRC signalling.

Example 11 may include the method of example 1 or some other example herein, wherein HARQ-ACK feedback timing (denoted as $G_1$) may be defined in accordance with the starting or last symbol of PDCCH or PDSCH transmission and the starting symbol of PUCCH carrying HARQ-ACK feedback.

Example 12 may include the method of example 1 or some other example herein, wherein HARQ-ACK feedback timing can be predefined in the specification, configured by higher layers via RMS1 (SIB1), OSI or RRC signalling, or dynamically indicated in the downlink control information (DCI) or a combination thereof.

Example 13 may include the method of example 1 or some other example herein, wherein when different subcarrier spacings are configured for the transmission of PDCCH and PDSCH, and/or PUSCH, the number of symbol or symbol groups is determined in accordance with the numerology of scheduled transmission, e.g., PDSCH and/or PUSCH.

Example 14 may include the method of example 1 or some other example herein, wherein the reference starting symbol of PDSCH and PUSCH, e.g., $G_0=0$ and $G_2=0$, corresponds to the first symbol index of PDSCH and/or PUSCH which overlaps with the last symbol of PDCCH, respectively.

Example 15 may include may include the method of example 1 or some other example herein, wherein when different subcarrier spacings are configured for the transmission of PDSCH and PUCCH, the number of symbol or symbol groups is determined in accordance with the numerology of PUCCH transmission carrying HARQ-ACK feedback of the corresponding PDSCH.

Example 16 may include the method of example 1 or some other example herein, wherein the reference symbol of PUCCH, e.g., $G_1=4$ corresponds to the first or last symbol index of PUCCH which overlaps with the last symbol of PDCCH.

Example 17 may include a method comprising:

determining a set of values for data channel scheduling and/or hybrid automatic repeat request—acknowledgement (HARQ-ACK) timing for a symbol group including one or more symbols; and encoding, for transmission to a user equipment (UE), a downlink control information (DCI) that includes a field to indicate a first value of the set of values to be used by the UE for data channel scheduling and/or HARQ-ACK timing.

Example 18 may include the method of example 17 or some other example herein, further comprising encoding, for transmission to the UE, a scheduling assignment for a data channel to be transmitted on one or more symbols of the symbol group; and receiving HARQ-ACK feedback for the data channel based on the first value.

Example 19 may include the method of example 18 or some other example herein, wherein the scheduling assignment is included in the DCI.

Example 20 may include the method of example 17-19 or some other example herein, further comprising transmitting or causing transmission of or receiving or causing receipt of the data channel on the symbol group.

Example 21 may include the method of example 17-20 or some other example herein, wherein individual symbols of the symbol group have a ratio of length of cyclic prefix (CP) to effective orthogonal frequency-divisional multiplexing (OFDM) symbol of 11/64, wherein symbol boundary with subcarrier spacing (SCS) of $15 \cdot 2^\mu$ kHz is aligned with a symbol boundary with SCS 15 kHz and normal CP in every 2.5·n ms, n=1, 2, etc.

Example 22 may include the method of example 17-20 or some other example herein, wherein individual symbols of the symbol group have a ratio of a length of CP to effective OFDM symbol of A/B when assuming $B_{OFDM}$ symbols with CP are allocated in every period $(A+B) \cdot T_{OFDM}$.

Example 23 may include the method of example 17-22 or some other example herein, wherein the one or more symbols of the symbol group have a common effective length equal to: $T'_{OFDM}=[X-(TCP1 \cdot A+TCP2 \cdot B)]/[(A+B)]$.

Example 24 may include the method of example 17-23 or some other example herein, wherein the data channel is transmitted on the symbol group with slot-less operation and using a subframe or frame for reference timing.

Example 25 may include the method of example 24 or some other example herein, wherein the subframe is 1 ms and/or the frame is 10 ms.

Example 26 may include the method of example 17-25 or some other example herein, further comprising determining a reference timing for transmission of the data channel on the symbol group based on a detected synchronization signal block (SSB), a GC-PDCCH, or a related demodulation reference signal (DMRS).

Example 27 may include the method of example 17-26 or some other example herein, wherein a scheduling gap between the DCI and the data channel scheduled by the DCI is defined at the symbol level or symbol group level.

Example 28 may include the method of example 27 or some other example herein, wherein the scheduling gap is predefined in the specification, configured by higher layers via RMS1 (SIB1), OSI or RRC signalling, and/or dynamically indicated in the DCI.

Example 29 may include the method of example 27-28 or some other example herein, further comprising indicating the scheduling gap and a length of the data channel transmission as part of a time domain resource allocation (TDRA).

Example 30 may include the method of example 17-29 or some other example, wherein the data channel is a PDSCH, wherein a scheduling gap between a PDCCH that includes the DCI and the PDSCH is expressed as $G_0=g_0+d_0$, and wherein the method further comprises encoding, for transmission to the UE, configuration information to indicate a set of values of $g_0$.

Example 31 may include the method of example 30 or some other example herein, wherein the configuration information is transmitted via SIB1 and/or dedicated RRC signaling.

Example 32 may include the method of example 30-31 or some other example herein, further comprising encoding, for transmission to the UE, an indicator of one value of the set of values to use for the determining the scheduling gap.

Example 33 may include the method of example 32 or some other example herein, wherein the indicator is included in the DCI.

Example 34 may include the method of example 17-33 or some other example herein, further comprising receiving or providing HARQ-ACK feedback based on a HARQ-ACK feedback timing, wherein the HARQ-ACK feedback timing is defined based on a starting or last symbol of the data channel transmission and the starting symbol of a feedback transmission carrying HARQ-ACK feedback.

Example 35 may include the method of example 34 or some other example herein, wherein the feedback transmission is on a PUCCH.

Example 36 may include the method of example 34-35 or some other example herein, wherein HARQ-ACK feedback timing is predefined in the specification, configured by higher layers via RMSI (SIB1), OSI or RRC signalling, or dynamically indicated in the DCI or a combination thereof.

Example 37 may include the method of example 17-36 or some other example herein, wherein a reference starting symbol of the data channel transmission corresponds to the first symbol index of the data channel transmission which overlaps with the last symbol of the PDCCH that includes the DCI.

Example 38 may include may include the method of example 17-37 or some other example herein, wherein different subcarrier spacings are configured for the transmission of PDSCH and PUCCH, and wherein the method further comprises determining the number of symbols or symbol groups in accordance with the numerology of PUCCH transmission carrying HARQ-ACK feedback of the corresponding PDSCH.

Example 39 may include the method of example 17-38 or some other example herein, wherein a reference symbol of a PUCCH corresponds to a first or last symbol index of the PUCCH which overlaps with the last symbol of a PDCCH.

Example 40 may include the method of example 17-39 or some other example herein, wherein the method is performed by a gNB or a portion thereof.

Example 41 may include a method comprising:
receiving a downlink control information (DCI) to schedule a data channel transmission, the DCI indicating a first set of values from a plurality of sets of values for a data channel scheduling gap and/or a hybrid automatic repeat request
acknowledgement (HARQ-ACK) timing defined for a symbol group including one or more symbols; and
encoding the data channel for transmission or receiving the data channel based on the first set of values.

Example 42 may include the method of example 41 or some other example herein, wherein the data channel transmission is on the symbol group.

Example 43 may include the method of example 41-42 or some other example herein, wherein individual symbols of the symbol group have a ratio of length of cyclic prefix (CP) to effective orthogonal frequency-divisional multiplexing (OFDM) symbol of 11/64, wherein symbol boundary with subcarrier spacing (SCS) of $15 \cdot 2^\mu$ kHz is aligned with a symbol boundary with SCS 15 kHz and normal CP in every 2.5·n ms, n=1, 2, etc.

Example 44 may include the method of example 41-43 or some other example herein, wherein individual symbols of the symbol group have a ratio of a length of CP to effective OFDM symbol of A/B when assuming $B_{OFDM}$ symbols with CP are allocated in every period $(A+B) \cdot T_{OFDM}$.

Example 45 may include the method of example 41-44 or some other example herein, wherein the one or more symbols of the symbol group have a common effective length equal to: $T'_{OFDM}=[X-(TCP1 \cdot A+TCP2 \cdot B)]/[(A+B)]$.

Example 46 may include the method of example 41-45 or some other example herein, wherein the data channel is transmitted on the symbol group with slot-less operation and using a subframe or frame for reference timing.

Example 47 may include the method of example 46 or some other example herein, wherein the subframe is 1 ms and/or the frame is 10 ms.

Example 48 may include the method of example 41-47 or some other example herein, further comprising determining a reference timing for transmission of the data channel on the symbol group based on a detected synchronization signal block (SSB), a GC-PDCCH, or a related demodulation reference signal (DMRS).

Example 49 may include the method of example 41-48 or some other example herein, wherein the scheduling gap between the DCI and the data channel transmission scheduled by the DCI is defined at the symbol level or symbol group level.

Example 50 may include the method of example 49 or some other example herein, wherein the scheduling gap is predefined in the specification, configured by higher layers via RMSI (SIB1), OSI or RRC signalling, and/or dynamically indicated in the DCI.

Example 51 may include the method of example 49-50 or some other example herein, further comprising receiving an indication of the scheduling gap and a length of the data channel transmission as part of a time domain resource allocation (TDRA).

Example 52 may include the method of example 41-51 or some other example, wherein the data channel is a PDSCH, wherein the scheduling gap between a PDCCH that includes the DCI and the PDSCH is expressed as $G_0=g_0+d_0$, and wherein the plurality of sets of values include respective values of $g_0$.

Example 53 may include the method of example 41-52 or some other example herein, further comprising receiving configuration information for the plurality of sets of values via SIB1 and/or dedicated RRC signaling.

Example 54 may include the method of example 41-53 or some other example herein, further comprising receiving or providing HARQ-ACK feedback based on the HARQ-ACK feedback timing, wherein the HARQ-ACK feedback timing is defined based on a starting or last symbol of the data channel transmission and the starting symbol of a feedback transmission carrying HARQ-ACK feedback.

Example 55 may include the method of example 54 or some other example herein, wherein the feedback transmission is on a PUCCH.

Example 56 may include the method of example 34-35 or some other example herein, wherein the HARQ-ACK feedback timing is predefined in the specification, configured by higher layers via RMSI (SIB1), OSI or RRC signalling, or dynamically indicated in the DCI or a combination thereof.

Example 57 may include the method of example 41-56 or some other example herein, wherein a reference starting symbol of the data channel transmission corresponds to the first symbol index of the data channel transmission which overlaps with the last symbol of the PDCCH that includes the DCI.

Example 58 may include may include the method of example 41-57 or some other example herein, wherein different subcarrier spacings are configured for the transmission of PDSCH and PUCCH, and wherein the number of symbols or symbol groups are determined in accordance with the numerology of PUCCH transmission carrying HARQ-ACK feedback of the corresponding PDSCH.

Example 59 may include the method of example 41-58 or some other example herein, wherein a reference symbol of a PUCCH corresponds to a first or last symbol index of the PUCCH which overlaps with the last symbol of a PDCCH.

Example 60 may include the method of example 41-59 or some other example herein, wherein the method is performed by a UE or a portion thereof.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a generation Node B (gNB) configured for operating in a fifth generation (5G) system, the apparatus comprising: processing circuitry; and memory, the processing circuitry is configured to:

encode a downlink control information (DCI) for transmission to a user equipment (UE), the DCI to schedule a data channel transmission, wherein for slot-less operation, the DCI is encoded to dynamically indicate one or more values to select from a set of values for a data channel scheduling gap and hybrid automatic repeat request—acknowledgement (HARQ-ACK) timing, the set of values defined for a symbol group including one or more OFDM symbols, the symbol group crossing a slot boundary; and encode the data channel for transmission based on the one or more values of the set of values, wherein the data channel is transmitted on the symbol group with slot-less operation and using a subframe or frame for reference timing, and wherein the set of values is configured to the UE by dedicated radio-resource control (RRC) signalling.

2. The apparatus of claim 1, wherein values of the set of values for the data channel scheduling gap includes:

a first scheduling gap (G0) corresponding to a number of symbols between a physical downlink control channel (PDCCH) carrying the DCI and a physical downlink shared channel (PDSCH) scheduled by the DCI; and a second scheduling gap (G2) corresponding to a number of symbols between the PDCCH and a physical uplink shared channel (PUSCH) scheduled by the DCI, and wherein values of the set of values for the HARQ-ACK timing include a HARQ-ACK timing gap (G1) corresponding to a number of symbols between the PDSCH and a subsequent PUCCH, the HARQ-ACK timing gap (G1) for receipt of HARQ-ACK transmissions from the UE.

3. The apparatus of claim 2, wherein the processing circuitry is further configured to transmit OFDM symbols for communicating in accordance with a frame structure, the transmitted OFDM symbols having an effective symbol length, a subcarrier spacing (SCS) of $15 \cdot 2^\mu$ kHz and a cyclic prefix (CP), where µ is a positive integer less than or equal to eight.

4. An apparatus of a generation Node B (gNB) configured for operating in a fifth generation (5G) system, the apparatus comprising: processing circuitry; and memory, the processing circuitry is configured to:

encode a downlink control information (DCI) for transmission to a user equipment (UE), the DCI to schedule a data channel transmission, wherein for slot-less operation, the DCI is encoded to indicate a set of values for a data channel scheduling gap and hybrid automatic repeat request—acknowledgement (HARQ-ACK) timing, the set of values defined for a symbol group including one or more OFDM symbols; and encode the data channel for transmission based on one or more values of the set of values, wherein the data channel is transmitted on the symbol group with slot-less operation and using a subframe or frame for reference timing, wherein values of the set of values for the data channel scheduling gap includes:

a first scheduling gap (G0) corresponding to a number of symbols between a physical downlink control channel (PDCCH) carrying the DCI and a physical downlink shared channel (PDSCH) scheduled by the DCI; and a second scheduling gap (G2) corresponding to a number of symbols between the PDCCH and a physical uplink shared channel (PUSCH) scheduled by the DCI, and wherein values of the set of values for the HARQ-ACK timing include a HARQ-ACK timing gap (G1) corresponding to a number of symbols between the PDSCH and a subsequent PUCCH, the HARQ-ACK timing gap (G1) for receipt of HARQ-ACK transmissions from the UE, wherein the processing circuitry is further configured to encode OFDM symbols for transmission in accordance with a frame structure, the transmitted OFDM symbols having an effective symbol length, a subcarrier spacing (SCS) of $15.2^\mu$ kHz and a cyclic prefix (CP), and wherein a ratio of a length of the CP and the effective OFDM symbol length is approximately AB when B OFDM symbols with a CP are allocated in periods equaling $(A+B) \cdot T_{OFDM}$, where p is a positive integer less than or equal to eight, where $T_{OFDM}$ is the effective OFDM symbol length, and where A is a positive integer such that A+B is a factor of the SCS.

5. The apparatus of claim 4, wherein the processing circuitry is configured to allocate an integer number of OFDM symbols every X milliseconds (ms) where X is selected from the set of 0.5, 1, 2.5, 5 and 10.

6. The apparatus of claim 5, wherein for different CP lengths, the effective OFDM symbol length without the CP, of each OFDM symbol is equal to: $T_{OFDM} = [X - (T_{CP1} \cdot A + T_{CP2} \cdot B)]/[(A+B)]$, wherein $T_{CP1}$ is a length of a first CP and $T_{CP2}$ is a length of a second CP.

7. The apparatus of claim 5, wherein symbol boundaries of the transmitted OFDM symbols are configured to be aligned with symbol boundaries of OFDM symbols having a 15 KHz SCS.

8. The apparatus of claim 5, wherein the ratio of the length of the CP and the effective OFDM symbol length is 11/64, wherein a symbol boundary with the SCS of $15 \cdot 2^\mu$ kHz is aligned with a symbol boundary with a SCS of 15 kHz and a normal CP in every 2.5 milliseconds.

9. The apparatus of claim 8, wherein the gNB is configured for communicating with the UE at a carrier frequency above 52.6 GHz.

10. The apparatus of claim 8, wherein the memory is configured to store the DCI.

11. A non-transitory computer-readable storage medium that stores instructions for execution by processing circuitry of a generation Node B (gNB) configured for operating in a fifth generation (5G) system, the processing circuitry configured to:

encode a downlink control information (DCI) for transmission to a user equipment (UE), the DCI to schedule a data channel transmission, wherein for slot-less operation, the DCI is encoded to dynamically indicate one or more values to select from a set of values for a data channel scheduling gap and hybrid automatic repeat request—acknowledgement (HARQ-ACK) timing, the set of values defined for a symbol group including one or more OFDM symbols, the symbol group crossing a slot boundary; and encode the data channel for transmission based on the one or more values of the set of values, wherein the data channel is transmitted on the symbol group with slot-less operation and using a subframe or frame for reference timing, and wherein the set of values is configured to the UE by dedicated radio-resource control (RRC) signaling.

12. The non-transitory computer-readable storage medium of claim 11, wherein values of the set of values for the data channel scheduling gap includes:

a first scheduling gap (G0) corresponding to a number of symbols between a physical downlink control channel (PDCCH) carrying the DCI and a physical downlink shared channel (PDSCH) scheduled by the DCI; and a second scheduling gap (G2) corresponding to a number of symbols between the PDCCH and a physical uplink shared channel (PUSCH) scheduled by the DCI, and wherein values of the set of values for the HARQ-ACK timing include a HARQ-ACK timing gap (G1) corresponding to a number of symbols between the PDSCH and a subsequent PUCCH, the HARQ-ACK timing gap (G1) for receipt of HARQ-ACK transmissions from the UE.

13. An non-transitory computer-readable storage medium of claim 11, wherein the processing circuitry is further configured to transmit OFDM symbols for communicating in accordance with a frame structure, the transmitted OFDM symbols having an effective symbol length, a subcarrier spacing (SCS) of $15 \cdot 2^\mu$ kHz and a cyclic prefix (CP), where µ is a positive integer less than or equal to eight.

14. The non-transitory computer-readable storage medium of claim 13, wherein a ratio of a length of the CP and the effective OFDM symbol length is approximately AB when B OFDM symbols with a CP are allocated in periods equaling $(A+B) \cdot T_{OFDM}$, where p is a positive integer less than or equal to eight, where $T_{OFDM}$ is the effective OFDM symbol length, and where A is a positive integer such that A+B is a factor of the SCS.

15. The non-transitory computer-readable storage medium of claim 14, wherein the processing circuitry is configured to allocate an integer number of OFDM symbols every X milliseconds (ms) where X is selected from the set of 0.5, 1, 2.5, 5 and 10.

16. The non-transitory computer-readable storage medium of claim 15, wherein for different CP lengths, the effective OFDM symbol length without the CP, of each OFDM symbol is equal to: $T_{OFDM}=[X-(T_{CP1} \cdot A+T_{CP2} \cdot B)]/[(A+B)]$, wherein $T_{CP1}$ is a length of a first CP and $T_{CP2}$ is a length of a second CP.

17. The non-transitory computer-readable storage medium of claim 15, wherein symbol boundaries of the transmitted OFDM symbols are configured to be aligned with symbol boundaries of OFDM symbols having a 15 KHz SCS.

18. The non-transitory computer-readable storage medium of claim 15, wherein the ratio of the length of the CP and the effective OFDM symbol length is 11/64, wherein the symbol boundary with the SCS $15 \cdot 2^\mu$ kHz is aligned with a symbol boundary with a SCS of 15 kHz and a normal CP in every 2.5 milliseconds.

19. An apparatus of a user equipment (UE) configured for operating in a fifth generation (5G) system, the apparatus comprising: processing circuitry; and memory, the processing circuitry configured to:
decode dedicated radio-resource control (RRC) signalling to configure the UE with a set of values for a data channel scheduling gap and hybrid automatic repeat request—acknowledgement (HARQ-ACK) timing:
decode a downlink control information (DCI) that schedules a data channel transmission, the DCI received from a generation node B (gNB), wherein for slot-less operation the DCI dynamically indicates one or more values to select from the set of values for the data channel scheduling gap and the hybrid automatic repeat request—acknowledgement (HARQ-ACK) timing, the set of values defined for a symbol group including one or more symbols, the symbol group crossing a slot boundary; and
decode the data channel based on the one or more values, wherein the data channel is transmitted on the symbol group with slot-less operation and using a subframe or frame for reference timing.

20. The apparatus of claim 19, wherein values of the set of values for the data channel scheduling gap includes:
a first scheduling gap (G0) corresponding to a number of symbols between a physical downlink control channel (PDCCH) carrying the DCI and a physical downlink shared channel (PDSCH) scheduled by the DCI; and
a second scheduling gap (G2) corresponding to a number of symbols between the PDCCH and a physical uplink shared channel (PUSCH) scheduled by the DCI, and
wherein values of the set of values for the HARQ-ACK timing include a HARQ-ACK timing gap (G1) corresponding to a number of symbols between the PDSCH and a subsequent PUCCH, the HARQ-ACK timing gap (G1) for HARQ-ACK transmissions by the UE.

* * * * *